United States Patent [19]

Sweeny

[11] Patent Number: 5,100,434

[45] Date of Patent: Mar. 31, 1992

[54] POLYBENZOBISTHIAZOLE AND POLYBENZOBISOXAZOLE FIBERS OF IMPROVED COMPRESSIVE PROPERTIES

[75] Inventor: Wilfred Sweeny, Wilmington, Del.

[73] Assignee: E. I. du Pont de Nemours and Company, Wilmington, Del.

[21] Appl. No.: 638,529

[22] Filed: Jan. 8, 1991

[51] Int. Cl.$^5$ ............................................. D06M 3/16
[52] U.S. Cl. .................................. 8/115.51; 8/115.54; 528/481
[58] Field of Search ............... 8/115.51; 528/183, 337, 528/172, 480, 481

[56] References Cited

U.S. PATENT DOCUMENTS 2,987,508  6/1961  Ruffing et al. .................. 528/481
4,423,202 12/1983  Choe ................................. 528/481

OTHER PUBLICATIONS

Journal of Materials Science 22 (1987) pp. 853-859.
Sampe Journal vol. 26, No. 2, Mar./Apr. 1990, pp. 51-60.

Primary Examiner—Prince Willis, Jr.
Assistant Examiner—John F. McNally

[57] ABSTRACT

Crosslinking of polybenzobisthiazole and polybenzobisoxazole in fiber formed by thermal elimination of halogen raises the compressive properties.

3 Claims, No Drawings

POLYBENZOBISTHIAZOLE AND POLYBENZOBISOXAZOLE FIBERS OF IMPROVED COMPRESSIVE PROPERTIES

BACKGROUND OF THE INVENTION

High modulus, high strength fibers, such as Kevlar® aramid fiber and fibers of polybenzobisthiazole (PBZ) and polybenzobisoxazole (PBO) have value in composites because of their toughness and fibrillar mode of failure. Among the organic fibers, Kevlar® aramid fiber is acknowledged to have the highest compressive stress to failure as determined by in-composite performance and laboratory tests; the best of which is the single filament recoil test. (See Kumar and Helminiak, SAMPE Journal, Vol. 26, No. 2 March/April 1990 for a discussion on this subject). This has been attributed to its interchain hydrogen bonded network. Compressive performance also relates directly to shear or torsional modulus i.e., the fibers, PAN carbon and glass have close to the highest compressive properties and shear moduli and this has been attributed to their covalent or ionically crosslinked structures. The invention as disclosed herein describes a simple route to PBZ and PBO fibers that have significantly improved torsional moduli and compressive stress values (from the single filament recoil test). This should translate to better compressive properties in end uses such as composites.

SUMMARY OF THE INVENTION

This invention provides cross-linked polybenzobisthiazole and polybenzobisoxazole fiber of improved torsional modulus and compressive stress. Such fiber is obtained by heating a fiber of polybenzobisthiazole or polybenzobisoxazole bearing at least one activated chloro-, bromo-, or iodo- phenylene ring substituent per 20 polymer units of the polymer chain, in an inert atmosphere and at a temperature of from 400° C. to 500° C. and for a time sufficient to eliminate at least 0.05 atoms of said halogen per polymer unit.

DETAILED DESCRIPTION OF THE INVENTION

The present invention relates to novel cross-linked PBO and PBZ fibers which are insoluble in methanesulfonic acid and have higher stress-to-failure and higher torsional modulus than the non-crosslinked polymer fiber. Preparation of the cross-linked fiber is based on thermal elimination of an activated aryl halogen (Cl,Br or I), followed by combination of the aryl free-radicals which are formed. Combination of the free radicals provides interchain coupling or cross-linking.

Evidence of cross-linking is established by the fact that the polymer is insoluble in methanesulfonic acid at temperatures less than or equal to 60° C., whereas the halogenated, non-cross-linked polymer is soluble under those conditions.

The stress-to-failure level is determined by the single filament recoil test described below. This measurement is an indication of expected performance in compression in a composite.

By "activated aryl halogen" is meant a chlorine, bromine or iodine substituent located on a phenylene ring of the polymer chain, adjacent to a carbonyl group. By "inert atmosphere" is meant a non-oxidizing atmosphere such as that provided by nitrogen or argon.

The PBO and PBZ fibers to be cross-linked in accordance with the present invention are formed from polymers prepared by reacting chloro-, bromo-, or iodoterephthalic acid with aromatic diamine dithiols or diaminediols in which the amines and thiols or hydroxyls are ortho oriented such that reaction with the acid moiety will form a five-membered benzothiazole or benzoxazole ring. Typical examples are those from chloroterephthalic, bromoterephthalic or iodoterephthalic acids and 4,6-diaminobenzene-1,3-dithiol, 4,6-diaminobenzene-1,3-diol or 3,3'-dihydroxy-4,4'-diaminobiphenyl. Such polymers or their copolymers contain at least one halogen atom per 20 polymer units and when converted to fiber are readily crosslinked by heating above 400° C. Time and temperature of heating should be selected to evolve the halogen at such a rate as to minimize voids in the fibers that reduce tensile properties significantly. This can be done by thermally treating the fibers in an inert atmosphere at from 400° C. to 500° C., preferably at about 450° C. until at least 0.05 atoms of halogen per polymer unit is eliminated. Both shear modulus and compressive stress to failure increase with crosslinking. Too high a level of crosslinking in these polymers results in a brittle carbon like mode of failure rather than the more desirable fibrillar mode of failure. Preferably no more than 0.5 atoms of halogen per polymer unit should be eliminated.

The preferred active halogens are bromine or iodine or chlorine. Fluorine does not evolve fast enough at temperatures below 500° C. to provide sufficient cross-linking to be useful.

ANALYSIS AND TESTING

Static oven treatments were run under nitrogen in an Eurotherm Controller Programmer 818 oven. Samples were run under 0.03–0.05 g/denier tension and were shielded from radiant heat by using aluminum foil shielding.

Fiber tensile properties were measured on single filaments using an Instron Model 1122 and a 2.5 cm (1 inch) gauge length at a 10%/min. strain rate at 21° C. (70° F.) and a 65% relative humidity, and reporting the average of ten filament breaks.

Single Filament Recoil test is described in detail in S. R. Allen, Journal of Material Science 22 (1987) 853–859. This was used as one indicator of compressive stress to failure.

Torsional modulus was measured on a Toray Torsional Rigidity Analyzer Model TR-301. A good description of the theory behind this test is given in Physical Properties of Textile Fibers, Morton and Hearle (1962); pages 383–393. The principle of the analyzer is that the specimen is twisted to a certain angle and the torque generated in it is made to balance against the torque provided by a rotating viscous liquid of known viscosity. The specimen to be measured is gripped between upper and lower clamps. The upper clamp is connected to the constant speed motor, while the lower one is connected to a solid cylinder that is suspended in a viscous liquid, contained in a plastic container which is rotated by a pulse motor in the direction opposite to the constant speed motor. The angular position of the solid cylinder is kept constant by a photo electric detector linked to a controller which regulates the speed of the plastic container providing the torque to the solid cylinder. The torque is given by the equation:

$$\text{Torque} = K \times V \times W$$

where K is a shape factor; V is the viscosity of the liquid; and W is the rotating speed of the plastic container. The computer readout is designed to give a plot of torque (in dynes/cm) on the ordinate against twist (in radians/cm) on the abscissa. Tangent of the curve prior to the yield or failure point, normalized for cross-sectional area, provides torsional modulus in Giga Pascals, GPa, (after units conversion). Examples of resulting torsional moduli are shown in Table 1.

The following examples are illustrative of the invention and are not intended as limiting.

INTERMEDIATES

Chloroterephthaloyl chloride b.p. 105° C./1mm (99% pure by gas chromotography, GC) was made by reaction of the acid with thionyl chloride The acid was made from chloro-p-xylene by oxidation with aqueous sodium dichromate in the presence of tetrabutylammonium hydrogen sulfate in an autoclave with vigorous agitation at 250° C.

Bromoterephthaloyl chloride b.p. 98-104° C./0.3-0.4mm (99% pure by GC) was made by reaction of bromoterephthalic acid (Lancaster Synthesis) with thionyl chloride Iodoterephthaloyl chloride. The acid precursor was made by basic (NaOH) permanganate oxidation of 2-iodotoluic acid according to Abbes (Ber., 1893, vol. 26, 2951). The iodoterephthalic acid melted at 299° C. (Abbes gives m.p. 274-276). The acid chloride was made by refluxing with excess thionyl chloride/DMF (dimethylformamide) catalyst. Removal of the excess thionyl chloride left a red oil which was distilled through a 24 inch spinning band column to give a slightly pink fraction b.p. 114-115° C./0.6mm (92% pure). The fraction was distilled twice more at 110°-112° C./0.4mm but was still slightly pink. It was observed during distillation that the pot liquor was yellow. Thus it appeared that traces of iodine were being eliminated and contaminating the distillate. This was removed by heating the main distilled fraction in a flask for 3 hours at 60° C. at 0.3mm. This removed the iodine by sublimation, leaving a bright yellow pot liquor. Purity was 97% by GC. Elemental analysis:
Found: C=29.1; H=1.1%
Calculated: C-29.2; H-0.9%.

EXAMPLE 1

POLYBISBENZOTHIAZOLES

Typical polymerization =PBZ(T/BrT, 50/50)

The apparatus consisted of a 200 ml resin kettle (3 inch diameter) equipped with a three vaned paddle stirrer, argon inlet, air condenser outlet and stoppered port for chemicals addition. The equipment was flamed out with a propane torch while flushing with argon to remove all adsorbed moisture. 190 g Polyphosphoric acid (Fluka 85% $P_2O_5$) was added and deaerated by heating at 100°-120° C. (oilbath) overnight under a stream of argon. The temperature was raised to 120° C. and 0.03 g of dimethylaminopyridine was added as catalyst, followed by addition of 10.3 g bromoterephthaloyl chloride over 20 minutes. Stirring was continued for one hour, then the stirrer was raised until it just touched the surface of the reactants. This was done to control foaming on addition of the diamine dihydrochloride. 18.62 g of the diaminedithiol dihydrochloride was then added in small amounts over 2 hours. The surface stirring controlled the foaming from HCl evolution. After the final addition the temperature was raised to 140° C. for 1 hour; 160° C. for 1 hour, 180° C. for 48 hours; 190° C. for 6 hours. The thick gum was removed hot from the resin kettle and rolled and stored under nitrogen in Teflon film until time for spinning when the cooled gum was rolled into a cylinder and inserted into the spinning cell. Polymer inherent viscosities were measured at 0.1% concentration in methanesulfonic acid at 30° C. The inherent viscosity for this polymer was 30 dl/g. (The inherent viscosity numbers for other polymers prepared ranged from 9 to 30 dl/g).

Fiber was spun at 180° C., using a 10 hole, 0.005 inch diameter spinneret, into 10° C. water using a 0.5 cm air gap. Yarn was wound up at 100 meters/minute using an 11 to 1 spin stretch ratio. Spun yarn was extracted with distilled water to remove residual polyphosphoric acid and then air dried. Yarn from bobbins was plied to 40 ends and heat treated under argon by passing through a 12 inch tube heated from 400° to 500° C. under the highest tension without breakage Residence time in the hottest zone was 10 seconds Fibers were made in a similar manner from the same diaminedithiol intermediate and 100% bromoterephthaloyl chloride; from 100% iodoterephthaloyl chloride; from 50% iodoterephthaloyl chloride/50% terephthaloyl chloride; from 50% chlorophthaloyl chloride/50% terephthaloyl chloride; and from 100% terephthaloyl chloride to give the control polybisbenzothiazole.

Yarns were further treated by heating under nitrogen at 400-500° C. under 0.03-0.05 grams/denier load for 1-20 hours to eliminate the halogen and crosslink the fibers Results are shown in Table 1. The crosslinking process can be expected to be equally applicable to moieties containing two active halogens either on the one aromatic ring or distributed between rings.

TABLE 1

| POLYMER COMPOSITION | HEATING COND | CROSSLINKING CONDITIONS AND PROPERTIES | | | TENSILE PROPERTIES | | | |
|---|---|---|---|---|---|---|---|---|
| | | ATOMS OF HALOGEN ELIMINATED PER POLYMER UNIT | SHEAR MOD GPa | RECOIL STRESS TO FAILURE gpd | T | E | M | D |
| PBZ | 500° C./10 s | | 2.1 | 1.7 | 26.7 | 3.2 | 939 | 3 |
| PBZ | 425° C./1 h | | 1.9 | 1.7 | 25.3 | 2.8 | 839 | 3.3 |
| PBZ | 450° C./1 h | | 2.2 | | 17.5 | 2.5 | 626 | 2.2 |
| PBZ (100% BrT) | 500° C./10 s | 0.047 | 2.1 | | 16.3 | 1.8 | 871 | 1.9 |
| PBZ (100% BrT) | 450° C./1 h | | | | | | 542 | 1.5 |
| PBZ (100% BrT) | 425° C./1 h | 0.05 | 2.7 | 2.7 | 20.6 | 2.7 | 678 | 1.9 |
| PBZ (100% BrT) | 500° C./1 h | 0.44 | 3.5 | 2.7 | 29.9 | 4 | 724 | 3.1 |
| PBZ (100% BrT) | 425° C./3 h | 0.06 | 3 | 1.8 | 16.9 | 2.7 | 696 | 2.1 |
| PBZ (100% BrT) | 450° C./4 h | 0.22 | 3.4 | 4.9 | 16.6 | 2.2 | 763 | 1.9 |
| PBZ (100% BrT) | 450° C./2 h | 0.13 | 2.5 | 3.2 | 18.6 | 2.7 | 730 | 2 |
| PBZ (100% BrT) | 500° C./1 h | 0.44 | 4.1 | 2.7 | 7.2 | 1.4 | 482 | 1.9 |
| PBZ (50/50 BrT/T) | 500° C./20 s | 0.0365 | 2.3 | | 14.9 | 1.8 | 856 | 2.5 |
| PBZ (100% iodoT) | 425° C./5 h | 0.69 | 2.8 | | 9.4 | 1.7 | 522 | 3.6 |

TABLE 1-continued

| POLYMER COMPOSITION | CROSSLINKING CONDITIONS AND PROPERTIES | | | | TENSILE PROPERTIES | | | |
|---|---|---|---|---|---|---|---|---|
| | HEATING COND | ATOMS OF HALOGEN ELIMINATED PER POLYMER UNIT | SHEAR MOD GPa | RECOIL STRESS TO FAILURE gpd | T | E | M | D |
| PBZ (50/50 iodoT/T) | 425° C./1 h | 0.085 | 2.4 | 3.5 | 20.7 | 2.2 | 894 | 1.8 |
| PBZ (50/50 ClT/T) | 425° C./1 h | | 2.2 | | 19.5 | 1.9 | 864 | 1.5 |
| PBZ (50/50 ClT/T) | 475° C./1 h | | 3.2 | | 14.8 | 1.9 | 651 | 7.6 |

T = Tenacity (gpd)
E = Elongation %
M = Modulus (gpd)
D = Denier

I claim:

1. A method for preparing polybenzobisthiazole and polybenzobisoxazole fiber of improved torsional modulus and compressive stress comprising heating a fiber of polybenzobisthiazole or polybenzobisoxazole bearing at least one activated chloro-, bromo-, or iodo- phenylene ring substituent per 20 polymer units of the polymer chain, in an inert atmosphere at a temperature of from 400° C. to 500° C. and for at time sufficient to eliminate from the polymer at least 0.05 atoms of said halogen per polymer unit.

2. A process according to claim 1 wherein the polymer bearing the halogen substituents is polybenzobisthiazole.

3. A polybenzobisthiazole or polybenzobisoxazole fiber prepared as described in claim 1.

* * * * *